(12) United States Patent
Armstrong et al.

(10) Patent No.: US 8,691,474 B2
(45) Date of Patent: Apr. 8, 2014

(54) FUEL CELL STACK COMPONENTS AND MATERIALS

(75) Inventors: Tad Armstrong, Burlingame, CA (US); Deepak Bose, Fremont, CA (US); Matthias Gottmann, Sunnyvale, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 903 days.

(21) Appl. No.: 12/225,915

(22) PCT Filed: Apr. 2, 2007

(86) PCT No.: PCT/US2007/008224
§ 371 (c)(1),
(2), (4) Date: Jul. 8, 2009

(87) PCT Pub. No.: WO2009/133607
PCT Pub. Date: Nov. 6, 2008

(65) Prior Publication Data
US 2010/0209802 A1    Aug. 19, 2010

Related U.S. Application Data

(60) Provisional application No. 60/788,043, filed on Apr. 3, 2006.

(51) Int. Cl.
*H01M 8/02* (2006.01)
*H01M 8/04* (2006.01)
*H01M 8/10* (2006.01)
*H01M 8/12* (2006.01)

(52) U.S. Cl.
USPC ............ 429/518; 429/465; 429/468; 429/509

(58) Field of Classification Search
CPC ................... H01M 8/04246; H01M 8/04664; H01M 8/04671; H01M 8/04679; H01M 8/04686; H01M 8/04955; H01M 8/1253
USPC .......... 429/452, 465–470, 507–511, 517–522
See application file for complete search history.

(56) References Cited

U.S. PATENT DOCUMENTS 4,755,429 A   7/1988   Nickols et al.
5,453,331 A   9/1995   Bloom et al.
(Continued)

FOREIGN PATENT DOCUMENTS

WO     WO 02/29917 A1 *  4/2002  ............. H02M 8/02
WO     WO-2004/102706     11/2004

OTHER PUBLICATIONS

M. Cassidy et al., U.S. PTO Office Action, U.S. Appl. No. 11/730,555, dated Nov. 12, 2009, 21 pgs.

*Primary Examiner* — Jonathan Crepeau
*Assistant Examiner* — Jacob Buchanan
(74) *Attorney, Agent, or Firm* — The Marbury Law Group PLLC

(57) ABSTRACT

Various embodiments include a fuel cell stack including a plurality of fuel cells including a cell anode electrode, a cell electrolyte, and a cell cathode electrode and separated by a plurality of conductive interconnects and at least one material located in a cell anode electrode of the plurality of fuel cells which provides a conductive path between adjacent interconnects when the cell anode electrode between the adjacent interconnects fails.

4 Claims, 11 Drawing Sheets

(56) References Cited

U.S. PATENT DOCUMENTS

| | | |
|---|---|---|
| 6,428,920 B1 * | 8/2002 | Badding et al. ............... 429/458 |
| 6,492,053 B1 | 12/2002 | Donelson et al. |
| 6,589,681 B1 | 7/2003 | Yamanis |
| 7,135,248 B2 | 11/2006 | Finn et al. |
| 7,144,651 B2 | 12/2006 | Finn et al. |
| 2003/0157386 A1 * | 8/2003 | Gottmann et al. ............. 429/26 |
| 2003/0170527 A1 | 9/2003 | Finn et al. |
| 2004/0101742 A1 | 5/2004 | Simpkins et al. |
| 2004/0200187 A1 | 10/2004 | Warrier et al. |
| 2004/0209147 A1 * | 10/2004 | Finkenwirth et al. ........... 429/35 |
| 2005/0017055 A1 | 1/2005 | Kurz et al. |
| 2005/0106443 A1 * | 5/2005 | Adams et al. .................. 429/34 |
| 2005/0129988 A1 * | 6/2005 | Knights et al. .................. 429/7 |
| 2005/0136312 A1 | 6/2005 | Bourgeois et al. |
| 2005/0194720 A1 * | 9/2005 | Kelly et al. ................. 264/328.1 |
| 2005/0227134 A1 * | 10/2005 | Nguyen ......................... 429/32 |
| 2006/0147769 A1 * | 7/2006 | Murphy et al. ................. 429/23 |

\* cited by examiner

FUEL CELL STACK COMPONENTS AND MATERIALS

This application claims benefit of priority of U.S. provisional application No. 60/788,043 filed on Apr. 3, 2006, which is incorporated herein by reference in its entirety.

BACKGROUND OF THE INVENTION

The present invention is generally directed to fuel cells and more specifically to high temperature fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

Embodiments of fuel cell stack components and materials are described herein. It should be noted that each embodiment can be used independently of the other embodiments or together with any one, two, three, four, five or six other embodiments described below. Thus a fuel cell stack may include any combination of one to seven of the below described embodiments. Furthermore, while the embodiments are preferably used with solid oxide fuel cells (SOFC), other high and/or low temperature fuel cell types, such as molten carbonate, PEM, phosphoric acid, etc, may also be used if appropriate.

DETAILED DESCRIPTION OF THE EMBODIMENTS

Figure 1:
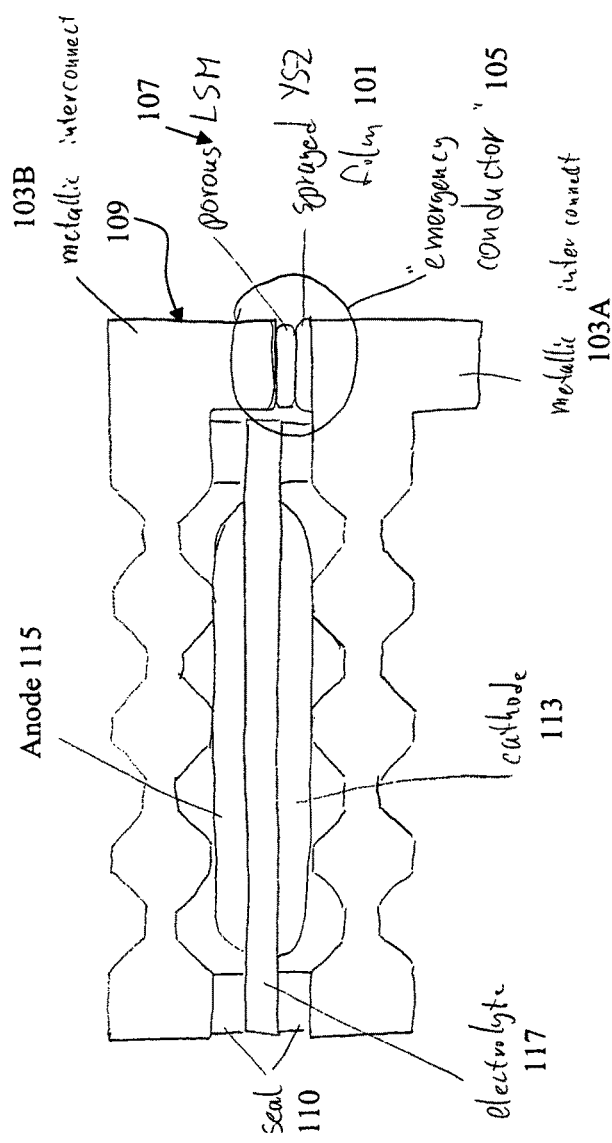
FIG. 1 illustrates a schematic side cross sectional view of a portion of the fuel cell stack with a bypass conductor according to the second embodiment.

I. Innovative Materials for Assembly of High Temperature Fuel Cells

The first embodiment of the invention describes how the compliant layers within a high temperature fuel cell stack can serve multiple purposes.

Planar high temperature fuel cell stacks are usually assembled using compliant layers for contact and sealing. These compliant layers can serve multiple purposes during assembly.

Planar fuel cell stacks are usually assembled from alternating layers of cells (electrolyte with electrodes (i.e., fuel and air electrodes on either side of the electrolyte) and optionally a frame) and interconnects (single or multi-part). The interconnect provides gas manifolding and electrical conductivity between adjacent cells. In other words, the interconnect can also serve as a gas separator plate. In a solid oxide fuel cell, the electrolyte comprises a solid oxide (i.e., ceramic), such as a stabilized zirconia, for example, YSZ, SSZ, etc.

Due to finite manufacturing tolerances, it is common to insert compliant layers between the interconnect and cells to support both the sealing and the electrical contact function, as described in U.S. application Ser. Nos. 10/369,322 and 10/369,133 filed on Feb. 20, 2003, which are incorporated herein by reference in their entirety.

A compliant seal material in the form of a paste, a tape, or a gasket provides sealing of the interconnect to the cell. A compliant conductive material, which can be applied as a paste, for example, provides an electrical conduction path from the interconnect to the cell.

The inventors have realized that these compliant layers can also at least temporarily serve as structural elements in the stack. If the compliant layer has the properties of an adhesive it can provide mechanical bonding between the interconnect and the cell.

Generally the compliant layers are prepared from the actual functional material (e.g. metal powder, metal oxide powder, glass-ceramic seal material, etc.) and a combination of solvents and binders that render the active material suitable for application. Application can happen by a variety of methods.

The compliant layer may be cast into a tape, which is then with a use of an adhesive attached to the interconnect or the cell. If an adhesive is supplied to both sides of the compliant tape, a mechanical connection between interconnect and cell can be achieved. This mechanical connection can provide structural integrity to the stack.

The compliant layer can act as a contact glue. In this case, the adhesive (which also fulfills the function of contact layer and/or seal) is applied to both mating surfaces (electrolyte/cell/frame and interconnect) (not necessarily the same adhesive on both sides) and the bond is created when the two adhesive layers contact the cell and the interconnect, respectively. Thus, the contact adhesive acts as the compliant layer when the stack and interconnect are adhered together.

Another way of applying the compliant layers is in a form of paste which is either printed or dispensed onto either (part of) the interconnect or the cell or both. If the binder and solvent used in the compliant layer can serve as an adhesive, and the stack is assembled while the adhesive is active, a structural bond between interconnect and cell can be created.

In one preferred aspect of the first embodiment, the adhesive used in the compliant layer is thermally activated. The thermally activated adhesive can be either reversible (e.g. melt) or irreversible (e.g. chemical cross link). In this case, the compliant layer can be applied to the interconnect or the cell or both sides before stack assembly. When the stack is assembled with these layers in place, it is heated to activate the adhesive and a strong mechanical bond is formed. For example, the adhesive can be melted or cross linked to form the bond between the cell and interconnect. The softening of the compliant layers during melting can provide improved compliance.

In another aspect of the first embodiment, the compliant layer is inserted as a solid (e.g. mesh, foam, felt, tape) and is activated as an adhesive during assembly. There are number of ways to activate a solid compliant layer to act as an adhesive. One possible way is by using a thermoplastic behavior of the solid body or part of the solid body, where the solid body is melted or partially melted. This type of solid compliant layer thus acts as a heat activatable adhesive.

One advantage of using the compliant layer as an adhesive is that the structural integrity of the fuel cell stack is improved. A stack prepared in this fashion can easily be handled and transported without the need or at least less need for fixtures to keep parts aligned.

Quite often the compliant layer is engineered such that the binder and solvent, which in this embodiment may provide the function of an adhesive, is burned out during the initial heat up of the stack and only the functional material remains. Thus, the adhesive binder and/or solvent are removed from the stack prior to its operation to generate electricity and the compliant layer may functions as a temporary adhesive during stack assembly. However, the active materials, such as the compliant tape or felt, may proceed to form a new mechanical bond between adjacent components, such as a bond between an interconnect and cell.

There is a large number of materials that can be used as binders and solvents in the compliant layer described above. One example for a thermally activated organic material is polycarbonate.

Either the seal or the electrical contact layer or both can be engineered to provide the adhesive function. In other words, the seal may be formed around a periphery of the electrodes in each cell to keep the fuel or air gas flow on or away from a fuel or air electrode of the cell. The seal may comprise an electrically insulating material. The contact layer is an electrically conductive layer which contacts the respective electrode and interconnect to provide an electrical contact between the electrode and interconnect.

II. Failure Tolerant Fuel Cell Stacks

The second embodiment of the present invention describes various ways to avoid failure of the fuel cell stack in case of a failure of a single fuel cell within the stack.

Fuel cells are usually operated in series, and depending on the application, large numbers of cells can be connected. Should one cell within a series of cells fail, then the internal resistance in this failed cell frequently increases to large values. In the most extreme case, all the voltage generated within the stack can be lost within the resistance in one cell. Even if total failure of the stack is not reached, significant losses of performance can occur and the heat dissipated in the failed cell can affect neighboring cells and cause the failure to propagate.

The prior art approach to this problem is to identify and eliminate the failure mechanism and thereby preserve the full performance potential of a series of fuel cells. However, often the cause of failure cannot be predicted or there is no remedy available once cell failure occurs.

Some modern high-performance cars have a design philosophy that can be applied to fuel cells. These cars often do not contain spare tires, due to a lack of space. Instead, the tires are designed such that they allow slow driving (also called "limp home") even if a tire gets damaged.

In a fuel cell stack, a similar principle can be used. The first aspect of the first embodiment of the invention addresses failures that affect the anode (i.e., the fuel electrode) of a fuel cell. In many fuel cells, the anode is the primary cause for catastrophic failure. Some anodes require strong reducing conditions in order to maintain their electrochemical, electrical, and mechanical functions. In case of insufficient fuel supply or excessive local currents (this applies primarily to oxygen conducting electrolytes of solid oxide fuel cells), the anode can be exposed to an environment that is not reducing enough, thus resulting in possible irreversible damage. One example for this type of failure is a cermet anode inside a solid oxide fuel cell. In this case, the anode is composed of a mixture of metal and ceramic, for example yttria stabilized zirconia (YSZ) and nickel. If the nickel is exposed to too high oxygen partial pressure it oxidizes and its conductivity is greatly reduced. During the oxidation the nickel changes volume (it expands) and the expansion can cause the anode structure to be destroyed (e.g. delamination of the anode). This kind of failure can quickly reduce the available conduction path for the ions traveling inside the electrolyte and the electrons transported away from the electrode. In this case, a single cell that was previously operating at a positive voltage (e.g. 0.75V) can become so resistive that its voltage becomes inversed and very large. This increase in resistive losses is only limited by the available voltage of all cells in series in the stack, in which case all power generated is lost in one single cell. This power is largely dissipated via ohmic heating with can lead to mechanical failure of the cell or adjacent interconnects.

The inventors have realized that materials can be added to the anode that can provide conductivity even when the actual anode is damaged. These materials may be unsuitable to be used by themselves due to performance and/or cost constraints, but a small amount of this material within the electrode can maintain a finite conductivity and thereby limit the losses that can occur within one cell. Examples for these "emergency conductors" are chromium (or its oxides), titanium oxides, or platinum. These examples illustrate several mechanisms by which conductivity can be maintained. Some of the mechanisms which can provide emergency conductivity are:

metallic conductor that does not oxidize;
conductive oxide, nitride and/or carbide;
conductive oxide that forms upon oxidation and reaction with the metal phase;
non-conductive oxide that becomes conductive (e.g. by application of large enough potential);
reduction and/or dielectric break down;
resistor parallel to cell.

These mechanisms may be used alone or in any suitable combination with one or more of the other mechanisms. For the first mechanism, a metallic conductor that does not oxidize, noble metals including Pd, Pt, Ag and Au and their respective alloys may be used. However, operating and processing temperatures may limit the use of some Ag and Au alloys. In this case, the noble metal may be added to the cermet, such as a nickel-stabilized zirconia cermet.

The second mechanism relies on a conductive oxide to provide the electrical conduction in the anode during reoxidation conditions. Examples of conductive oxides include, but are not limited to, $Cr_2O_3$; Ce, Gd, or Sm-doped $Cr_2O_3$; Gd or Sm-doped $CeO_2$; La—Cr perovskite phases including $La_{1-x}Sr_xCr_{1-y}Mn_yO_3$; Nb-doped $TiO_2$; Ce or Ti doped $ZrO_2$; Mn—Cr—Co based spinels; and Gd—Ti—Mo based pyrochlores. In addition, some conductive carbides or nitrides such as TiN could function as the conductive phase. The conductive oxide may be added to the cermet, such as a nickel-stabilized zirconia cermet, or it may be used as the ceramic phase of the cermet instead of the stabilized zirconia or it may be used as the entire anode material instead of the cermet.

In the third mechanism, a conductive oxide forms upon oxidation of the nickel metal phase. For example, small introductions of La- or Ti-oxide to nickel metal will result in the formation of the conductive perovskite phases $LaNiO_3$ and $NiTiO_3$ upon local oxidation. Similarly, the nickel metal can be doped such that upon oxidation a doped and more conductive nickel oxide phase is formed. For example, M (Fe and/or Co) doping of nickel metal will result in $Ni_{1-x}M_xO_2$ upon oxidation. In this mechanism, the anode cermet contains La oxide or Ti oxide in addition to the nickel and stabilized zirconia and/or it contains Fe and/or Co alloyed nickel or a mixture of Ni and Fe and/or Co as the metal phase.

In the fourth and fifth mechanisms, a non-conductive oxide or material becomes electrically conductive in a partially reducing atmosphere and with a large enough electrochemical potential. Examples of the oxides include $ZrO_2$ and $CeO_2$. Subsequent doping of these binary oxides with a mixed valence ion, such as Ti or Co, can significantly reduce the breakdown voltage and increase the electrical conductivity. In this mechanism, the anode cermet contains Ti and/or Co doped zirconia and/or ceria in addition to the nickel metal phase.

In an alternative aspect of the second embodiment, a bypass conductor is formed between adjacent interconnects in case of cell failure using the latter mechanisms described above. Commonly used solid oxide fuel cells (SOFC) often contain components needed to incorporate one of these mechanisms. The electrolytes used in SOFCs are usually ceramic oxygen ion conductors which become electronic conductors if large electrical potentials are applied. YSZ, which is one of the most popular electrolyte materials for SOFCs, reduces at potentials near 2.2V. If a thin sheet of YSZ is mated between two metallic surfaces, this assembly will have very poor total conductivity unless potentials higher than the reduction potential (near 2.2V) are applied at the metallic surfaces. Above the reduction potential, the YSZ is partly or completely reduced to metallic zirconium and becomes an electron conductor with much lower resistance. If this assembly is parallel to a fuel cell (it can also be integrated into the cell assembly, but still behave electrically parallel) the current is allowed to bypass the cell once the reduction potential is reached.

It is important to note that the reduction potential will only be reached once the cell resistance is so large that a large enough inverse (to normal operating polarity) potential has built up.

The amount of conductivity available from this bypass depends on a number of factors and can be engineered to meet the needs of the cell. Some of the important parameters are:
- available conduction area
- thickness of ceramic layer
- choice of ceramic material
- choice and bonding method of mating materials (these do not necessarily have to be metallic conductive oxides) may also provide attractive properties.

FIG. 1 shows a sketch of one non-limiting embodiment of the bypass conductor. A thin layer of YSZ 101 sprayed onto the cathode side of the metallic interconnect 103A is the central part of the bypass conductor 105. The spraying ensures that the cathode side of this film is hermetically bonded to the metal and thereby no oxygen ions can be created on the cathode side. If oxygen ions can be created at the cathode side there is a potential (small) leakage current under normal cell operation. However, other suitable layer deposition methods which provide a hermetic bond can also be used instead of spraying.

On the anode side of the layer 101, a thin layer 107 of porous lanthanum strontium manganite (LSM) provides an escape path (triple phase boundaries) for oxygen ions, which can help the reduction process at high reverse potentials (removal of oxygen from the YSZ).

As shown in FIG. 1, this bypass conductor 105 comprising layers 101 and 107 can become a part of the fuel cell assembly, but it could also be realized with a separate part which is electrically connected to the cell. In other words, as shown in FIG. 1, the anode and/or cathode side interconnect (such as the anode side interconnect 103B shown in FIG. 1) contains a peripheral extension 109 which extends toward the opposite interconnect 103A laterally or peripherally of the cell boundaries (i.e., around one or more edges of the electrolyte and the electrodes). The extension may extend outside the seals 110 as well. The YSZ 101 and LSM 107 layers physically separate the interconnects from each other at the periphery of the cell. Also shown in the FIG. 1 is the fuel cell containing electrodes 113, 115 separated by an electrolyte 117. The fuel cell is located between interconnects 103A and 103B. The cathode electrode 113 electrically contacts interconnect 103A while the anode electrode 115 of the cell electrically contacts interconnect 103B. An electrolyte 117, such as a solid oxide electrolyte of a SOFC, is located between the electrodes.

Alternatively, a separate device comprising two metal layers separated by LSM and YSZ layers may be used to form a bypass conductor. Each metal layer is electrically connected to a respective anode and cathode side interconnect. Thus, the LSM and YSZ layers may be located between separate metal layers inside or outside the stack boundary rather than between peripheral portions of the interconnects.

During normal operation of the stack, the anode side of the cell is negative and the cathode is positive. During cell failure the polarity reverses.

During normal operation, oxygen ions will try to migrate through the YSZ bypass 101 from the top to the bottom of FIG. 1. However they cannot escape at the hermetically sealed bottom interface and thereby only a negligible current can be sustained. As shown in FIG. 1, the bypass conductor 105 is located outside the fuel cell in hot ambient air. The LSM layer 107 is porous so air (oxygen) can travel through the porous LSM to the LSM/YSZ boundary.

During cell failure, oxygen ions try to migrate through the YSZ bypass 101 from the bottom to the top. A gradient in oxygen ion concentration will be established inside the YSZ, which once it is large enough, leads to reduction of the YSZ starting at the cathode side metallic interface. This reduction will continue all the way to the anode side interface in which case the metallic interconnects, the reduced YSZ, and the mixed conduction LSM form a bypass circuit. In this way, the current can flow between the cathode side 103A and anode side 103B interconnect through the bypass conductor 105 which comprises the reduced YSZ 101 (i.e., the conductive Zr metal formed during the reduction) and the electrically conductive LSM 107.

Other solid state oxide ionic conductors including Ce- and/or Sc-doped $ZrO_2$; and Sm-, Y-, and/or Gd-doped $CeO_2$ could function as the bypass material 101 instead of or in addition to YSZ. In addition, double doped fluorite systems including $Y_xTi_yZr_{1-x-y}O_2$ could also be used.

Furthermore, other electrically conductive perovskites, such as LSCo, LSCr, etc., and other electrically conductive ceramics may be used instead of LSM 107.

III. Low Cost SOFC Interconnect

The third embodiment provides a low cost, multi-component interconnect by using common sheet metal forming techniques.

The interconnect is comprised of three components: a flow separator plate, a cathode contact media and an anode contact media. The flow separator plate's purpose is to keep the fuel and air flow streams from intermixing. The contact media preferably comprise inserts which are inserted in or fitted to the flow separator plate. The cathode insert's purpose is to expose or provide an air flow to the fuel cell cathode (i.e., air) electrode while maintaining electrical conductivity. Any suitable material which can provide these functions at the fuel cell operating temperature may be used. For example, corrugated steel or a high temperature alloy foam may be used, as will be described in more detail in the fifth embodiment. The anode insert's purpose is to expose a fuel flow to the anode (i.e., fuel) electrode while maintaining electrical conductivity. Any suitable material which can provide these functions at the fuel cell operating temperature may be used. For example, corrugated steel or a nickel foam may be used, as will be described in more detail in the fourth embodiment.

The interconnect may be used with any suitable fuel cells, such as solid oxide fuel cells. The interconnect functions as a gas separator plate between adjacent fuel cells while providing electrical connection to and between the adjacent fuel cells. This construction provides an inexpensive interconnect that fulfills all the SOFC's requirements.

Figure 2:
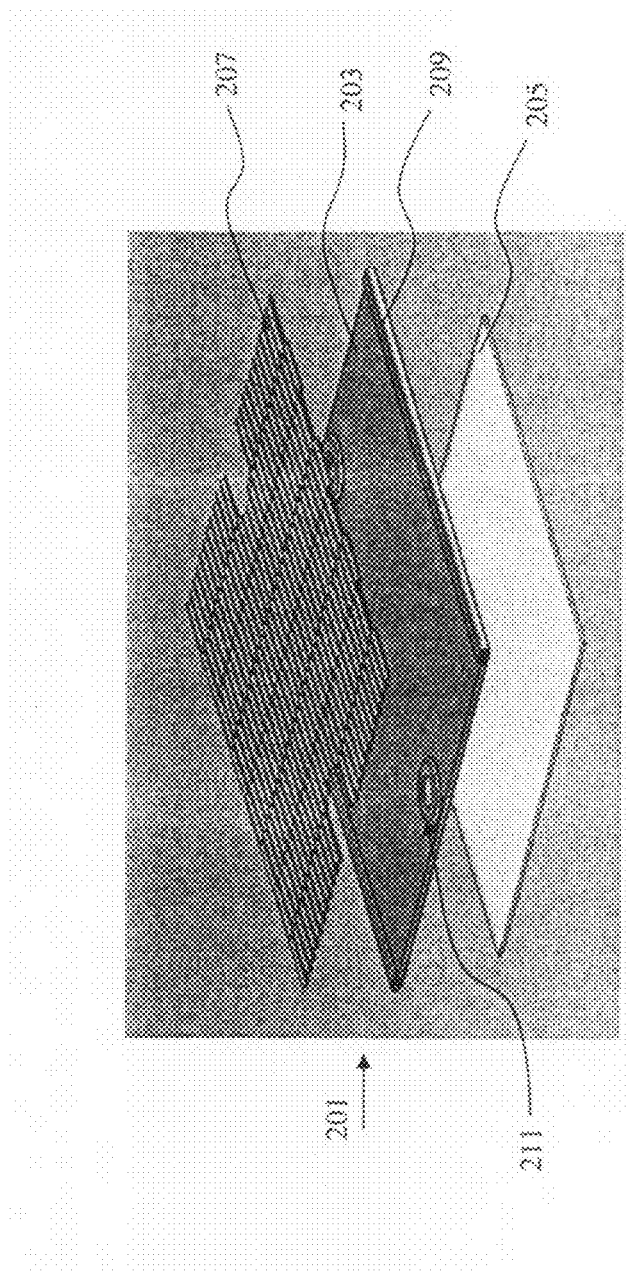
FIGS. 2 and 3 are three dimensional and top views, respectively, of fuel cell stack components according to the third embodiment.
Figure 3:
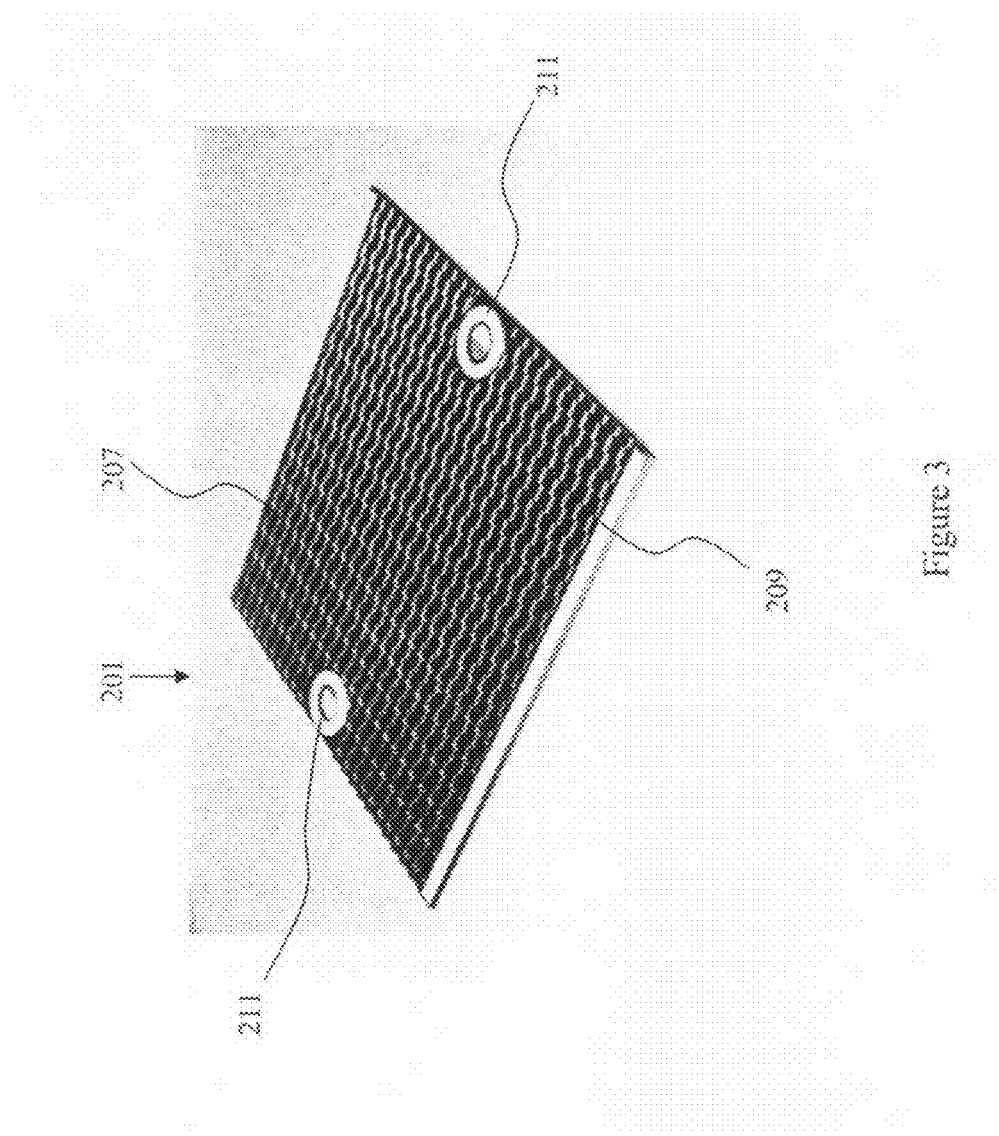

FIG. 2 illustrates the three components of the interconnect 201 prior to assembly. The flow separator plate (middle) part 203 is located between the anode 205 and cathode 207 inserts. The flow separator plate 203 may contain side rails 209 or side clamps which hold the inserts in place in the interconnect. While the interconnect illustrated in FIG. 2 contains two riser openings 211 for an internally manifolded for fuel and externally manifolded for air stack configuration, it should be understood that the interconnect may contain four riser openings for an internally manifolded for air and fuel configuration, or no riser openings for an externally manifolded for air and fuel configuration. FIG. 3 illustrates the top view of the interconnect 201 after assembly.

IV. Gas Flow Distribution Foam

As described with respect to the third embodiment above, an interconnect may comprise an anode contact media which comprises an electrically conductive foam material. The fourth embodiment describes the details of this foam. It should be noted that while the foam preferably comprises the anode insert in a flow separator plate described in the third embodiment, the foam may be located in a differently configured interconnect. For example, the interconnect may lack the cathode insert or the interconnect may comprise a monolithic structure rather than an insert-in-a-flow separator plate design.

Figure 4:
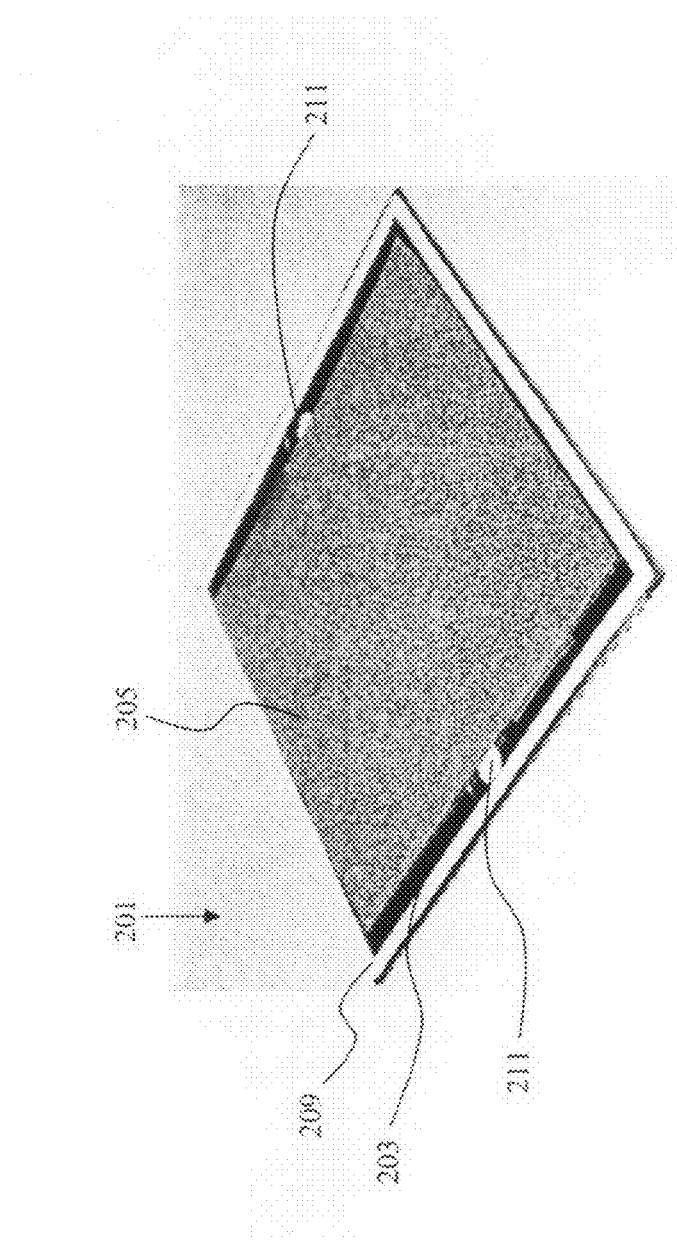
FIGS. 4-5 are three dimensional views of interconnect components according to the fourth embodiment.

The foam material in the anode flow field provides both electrical conductivity and allows gases (such as fuel gases) to flow from the stack inlet to the stack outlet (i.e., from the fuel inlet riser opening to the fuel outlet riser opening). Suitable foam materials, such as nickel and nickel alloy foams are described in U.S. application Ser. No. 10/369,133 filed on Feb. 20, 2003 and incorporated herein by reference in its entirety. FIG. 4 illustrates a foam insert 205 located within the interconnect anode cavity (i.e., attached to the anode contact side of the interconnect's flow separator plate 203). The interconnect 201 contains the side rails 209 and fuel riser openings 211 described above.

The present inventors noted that it is desirable to increase a pressure drop in the anode flow field foam to optimize in plane flow fuel distribution, since there are locations within the fuel cell cavities where there are high gas utilizations. The present inventors realized forming areas of low and high pressure will direct the gas flow to all areas of the fuel cell. This provides an ability to control the location of the gases within the interconnect cavity.

Preferably, the foam contains surface features which direct the gas flow in a desired location and/or direction over the anode electrode of the fuel cell. The surface features may comprise protrusions, such as ribs, and/or depressions, such as grooves to direct the fuel flow.

The surface features may be formed by cutting and pressing the foam into a die to impart the desired surface features to the foam. Other foam patterning methods may also be used to form the features.

Figure 5:
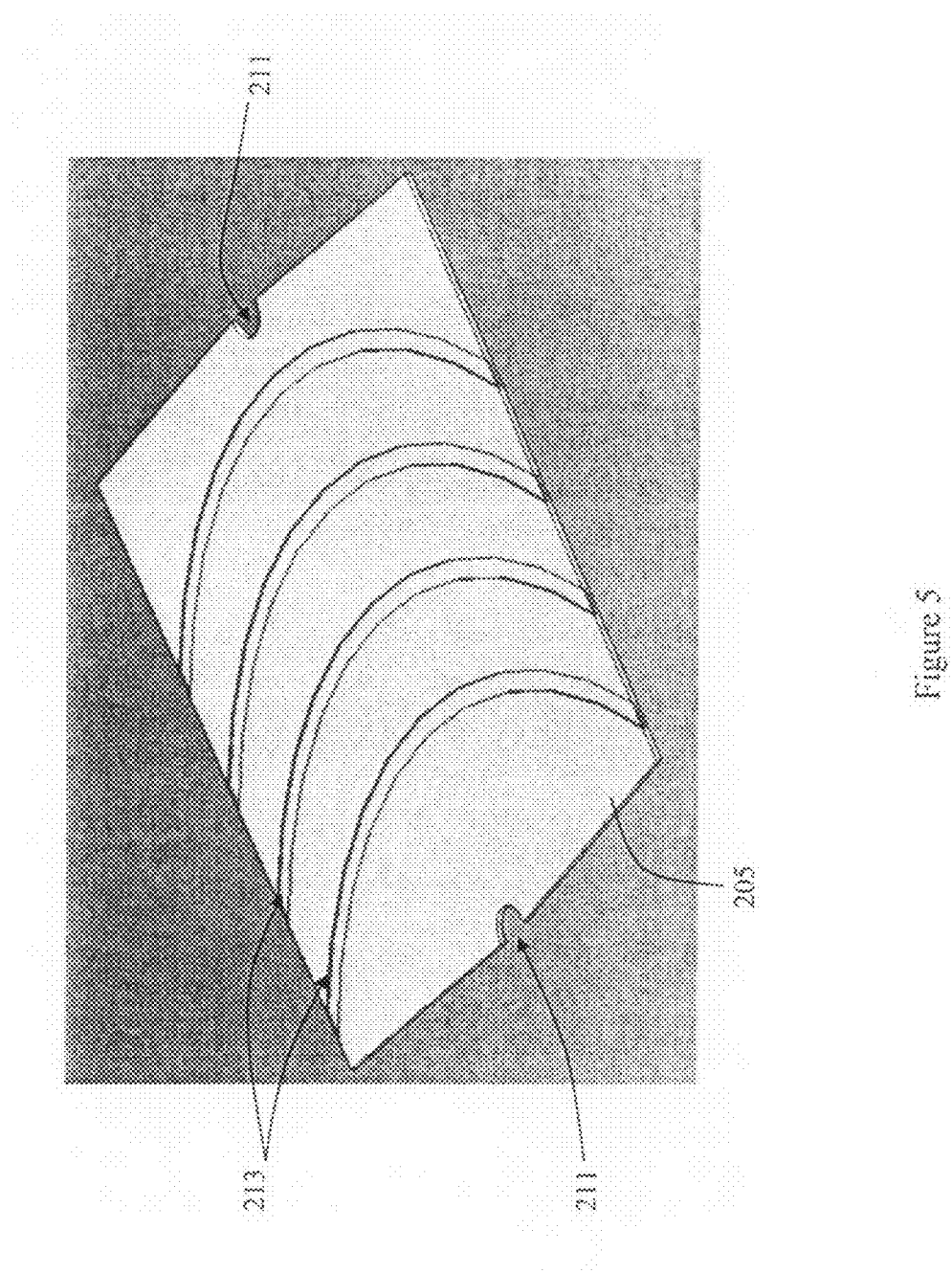

FIG. 5 illustrates one non-limiting example of surface features 213 which comprise bowed or curved ribs, such as arc-shaped, semi-circular or semi-oval ribs. The ribs are concave facing the fuel inlet riser opening (i.e., the fuel inlet) and are convex facing the fuel exhaust riser opening (i.e., the fuel outlet). The regions between the ribs comprise similarly shaped grooves. Alternatively, the foam may contain grooves formed into the surface of the foam rather than ribs extending from the surface of the foam to form an equivalent structure.

Figure 6:
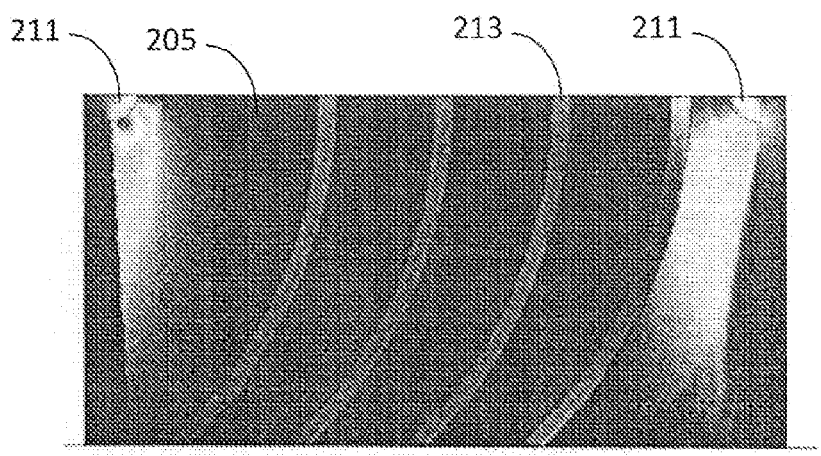
FIG. 6 is a computer simulator of the interconnect component shown in FIG. 5.

FIG. 6 illustrates a CFD modeling of gas distribution within an anode half cavity in which the foam contains the ribs shown in FIG. 5. The modeling illustrates the velocity in inches per second.

V. Foam Alloy for SOFC Cathode Contact and Flow Media

As described with respect to the third embodiment above, an interconnect may comprise a cathode contact media which comprises an electrically conductive foam material. The fifth embodiment describes the details of this foam. It should be noted that while the foam preferably comprises the cathode insert in a flow separator plate described in the third embodiment, the foam may be located in a differently configured interconnect. For example, the interconnect may lack the anode insert or the interconnect may comprise a monolithic structure rather than an insert-in-a-flow separator plate design.

The interconnect contains a foam material in its cathode flow field which provides both electrical conductivity and allows air to flow from the stack inlet to the stack outlet.

Nickel foam may be utilized on the anode side of the interconnect. However, since the cathode side of the interconnect is maintained in an oxidizing ambient, a nickel foam on the cathode side of the interconnect would oxidize very quickly.

Therefore, the cathode side foam comprises a material that can withstand the oxidation rates within a high temperature, moist, oxidizing environment without losing its electrical conductivity. The foam preferably comprises an oxidation resistant nickel alloy foam, such as a nickel alloy that contains nickel and one or more of oxidation resistant alloying elements, such as Cr, W, Co and/or Mo.

For example, the foam alloy may comprise a Haynes 230 alloy foam which has the following composition.

| Nominal Chemical Composition, Weight Percent | | | | | | | | | | | |
| --- | --- | --- | --- | --- | --- | --- | --- | --- | --- | --- | --- |
| Ni | Cr | W | Mo | Fe | Co | Mn | Si | Al | C | La | B |
| 57$^a$ | 22 | 14 | 2 | 3* | 5* | 0.5 | 0.4 | 0.3 | 0.10 | 0.02 | 0.015* |

In general nickel alloys which contain 0 to 35, such as 10 to 30 weight percent Cr, 0 to 25, such as 10 to 20 weigh percent W, 0 to 5 weight percent Mo, 0 to 5, such as 1 to 4 weight percent Co and at least 45, preferably greater than 50 weight percent Ni may be used. Preferably, the alloy contains at least one non-zero weight percentage of Cr, W or Mo. The alloy may also optionally comprise 0 to 5 weight percent Fe and 0 to 1 weight percent of one or more of Mn, Si, Al, C, La and B.

The foam is very flat, compliant and would allow gas flow though it. It also is electrically conductive. Alternatively, a felt or a mesh made of the nickel alloy may be used instead of the foam.

VI. Ceramic Interconnect with Flow Channels and Conducting Vias

The sixth embodiment of the invention provides a ceramic interconnect for use in a series connected, planar solid oxide fuel cell stack. The one piece ceramic interconnect is multifunctional and provides: a) manifolding and flow field for air, b) manifolding and flow field for fuel, c) gas separation between two chambers, and d) electrical interconnection of planar fuel cells.

The interconnect (IC) in a planar solid oxide fuel cell serves multiple functions, namely: 1) manifolding of air and fuel, 2) gas separation, and 3) electrical connection. In addition, the IC should possess adequate mechanical integrity, should be stable at SOFC operating temperatures, should have a similar coefficient of thermal expansion (CTE) of the cells, and should not react chemically with either the electrodes or sealing materials. Typically, ICs for planar SOFC stacks are metal-based and fabricated by a number of standard forming processes. Metal-based ICs have proven to be highly successful and have some inherent advantages including high thermal conductivity, good mechanical strength, and a potentially low cost fabrication route. However, one of the main disadvantages of metal-based ICs is the formation of a highly resistive oxide scale at operating temperature which can significantly limit the life of a planar SOFC stack. An alternative approach to the metallic IC is a ceramic-based IC that has the same functionality, yet eliminates the growth of an oxide scale with time.

Figure 7:
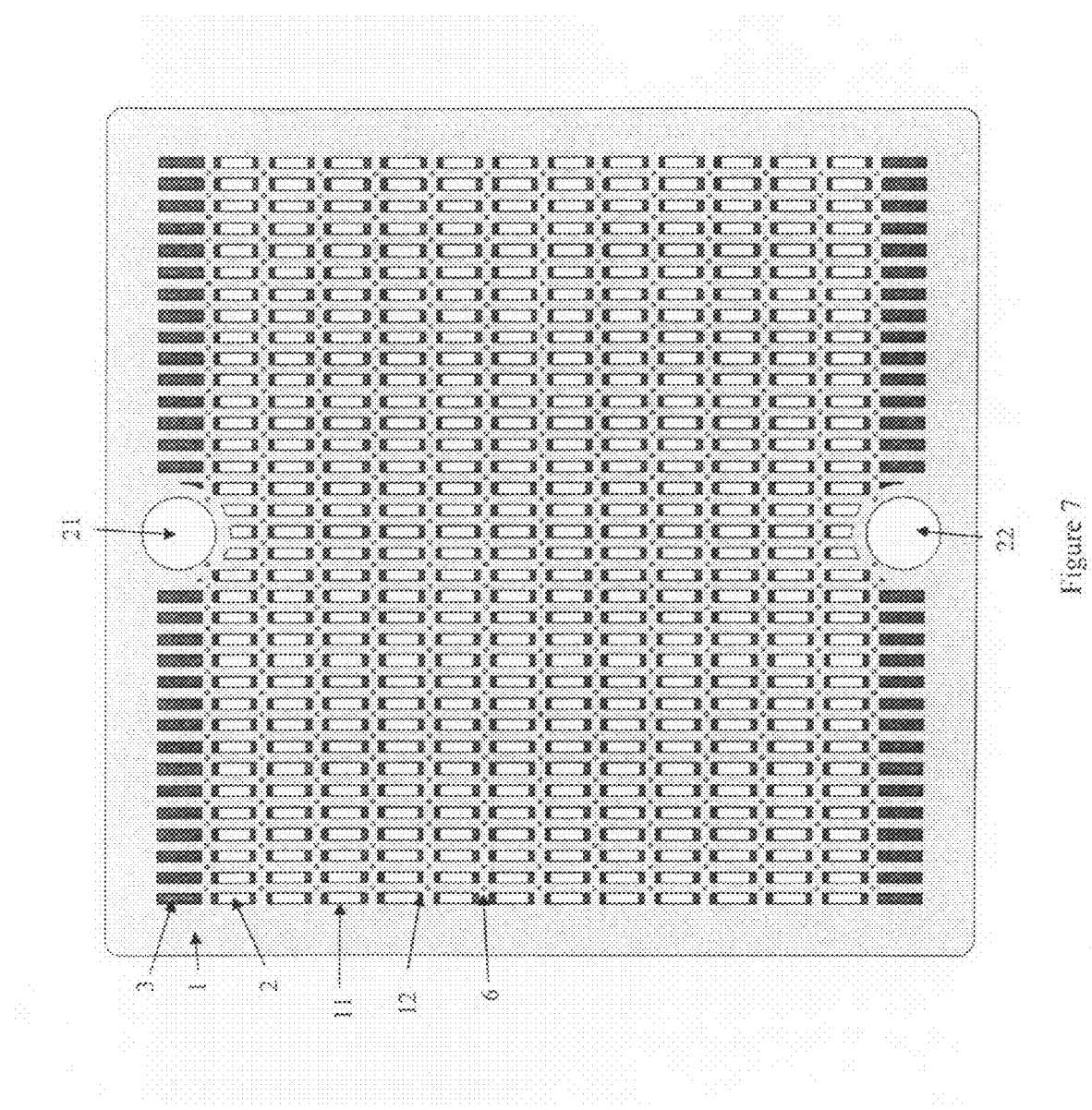
FIG. 7 is a top view of an interconnect according to the sixth embodiment.
Figure 8:
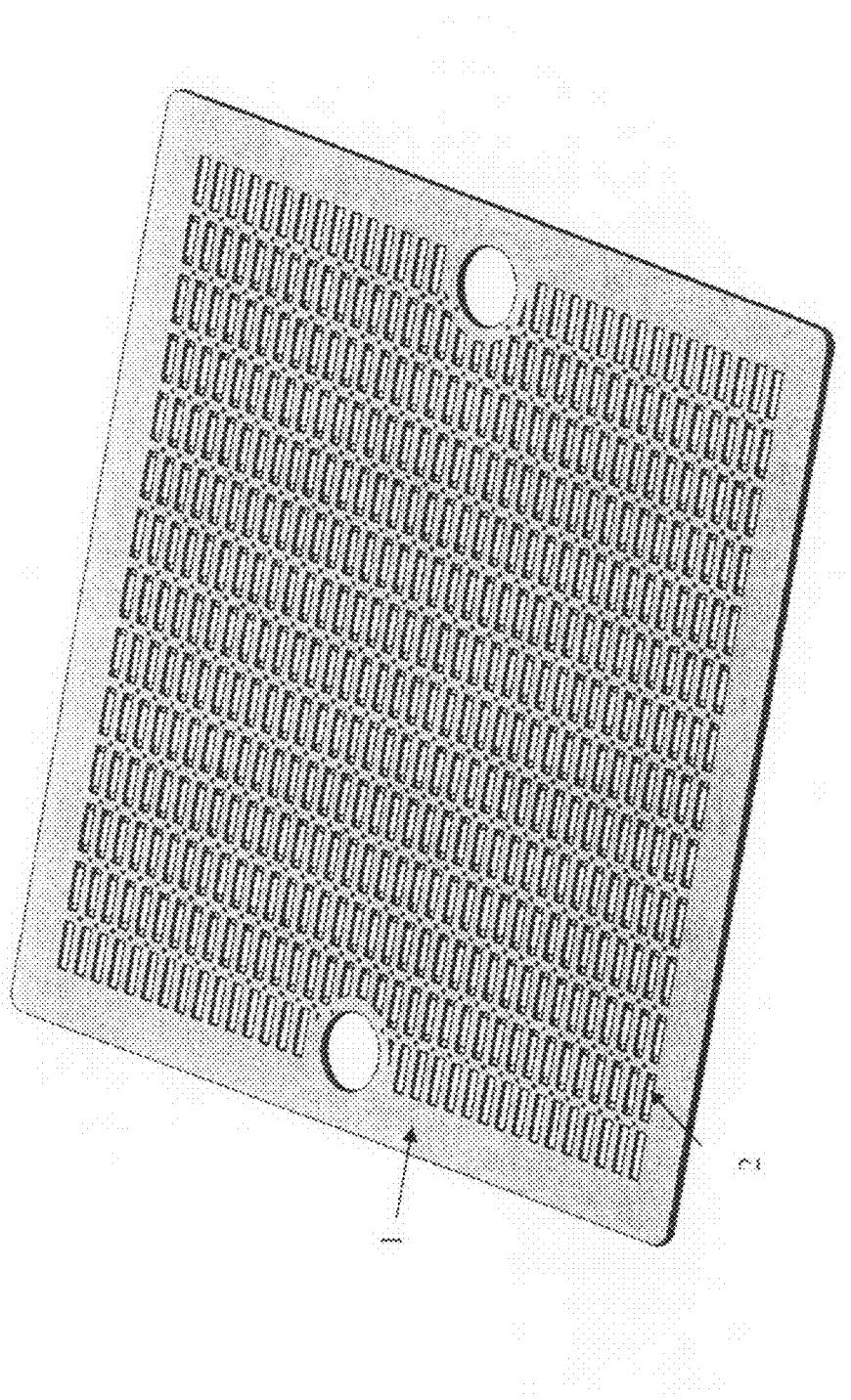
FIGS. 8-9 are three dimensional views of an interconnect according to the sixth embodiment.
Figure 9:
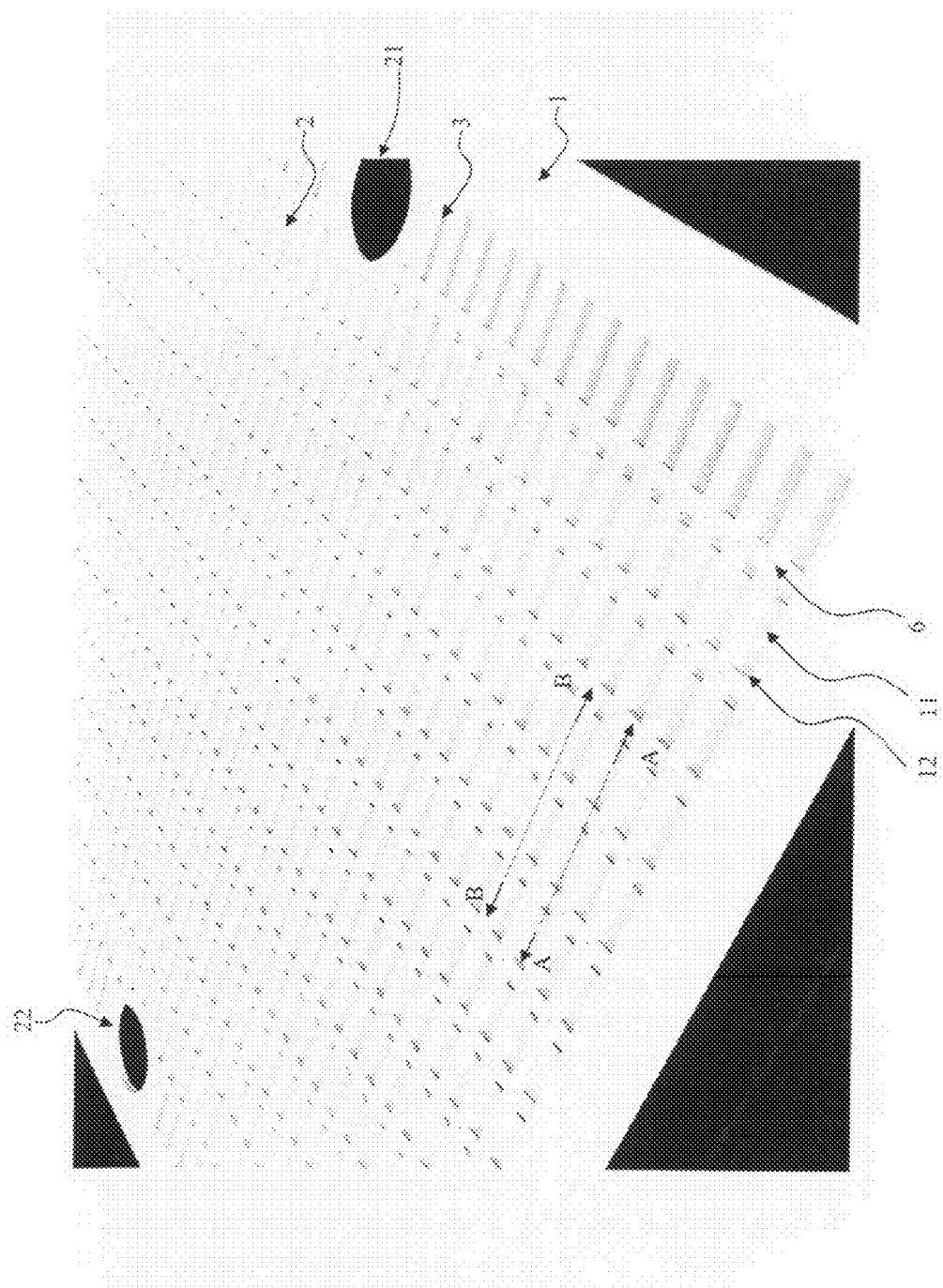
Figure 10:
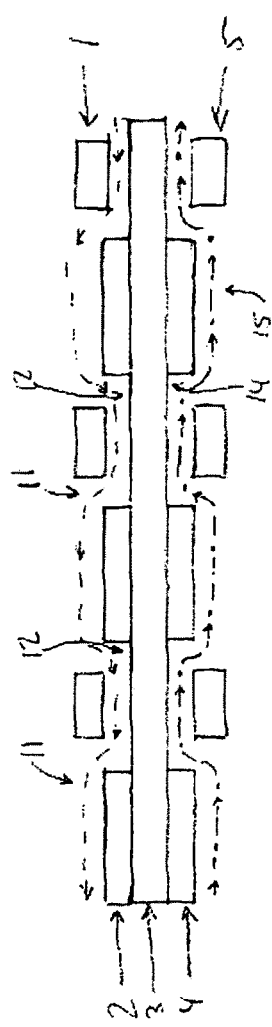
FIGS. 10-11 are side cross sectional views of an interconnect according to the sixth embodiment.
Figure 11:
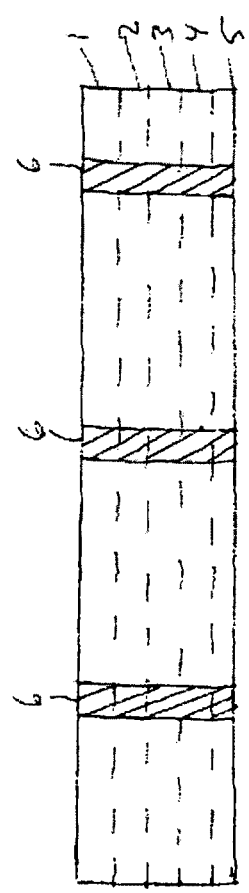

A ceramic IC of the sixth embodiment incorporates channels into the structure for flow fields and utilizes metal filled vias for electronic conduction. An exemplary geometry of the ceramic-based IC is shown in FIGS. 7 through 11. FIG. 7 is a top view, FIGS. 8 and 9 are three dimensional views and FIGS. 10 and 11 are side cross sectional views along lines A-A and B-B in FIG. 9, respectively. FIG. 7 is a schematic illustration of a top view of ceramic IC with flow fields and conducting vias. FIG. 8 is a three dimensional schematic illustration of a ceramic IC showing the top two layers (1 and 2). FIG. 9 is a three dimensional schematic illustration of flow fields and conducting vias of the ceramic IC.

In the illustrated case, the IC is formed from five distinct ceramic layers that are laminated together in the green state to form the final geometry. The top two layers 1 and 2 comprise the flow field for the cathode side of the cell, layer 3 is the solid gas-separator layer, and layers 4 and 5 comprise the flow fields for the anode side of the cell.

In this example, the flow fields are formed by punching offset rectangular holes 11 and 12, 14 and 15 in two adjacent layers (1 and 2; 4 and 5 respectively).

The offset hole-pattern results in an over-under flow path with an a-square dictated by the width of the channels and the thickness of the layers 1 and 2. The air and fuel flow directions are illustrated in FIG. 10 by the dashed and the dashed-dotted lines, respectively. As shown, the gases flow above each respective interior layer 2, 4 and below each respective exterior layer 1, 5.

In this design, the geometry of the flow fields for the air and fuel side of the interconnect can be designed independently for optimal flow distribution. In other words, the hole size and/or distribution may be different on the air and fuel side of the IC. The electrical current is carried through the IC by an array of metal or other electrically conductive material filled vias 6 located in between the flow channels. The vias 6 are punched in the green tape and filled with metal by a screen printing process. The 5-layer green part is laminated together and sintered, resulting in a fully dense ceramic part with metal via pathways.

In the schematic shown in FIGS. 7-9, the channels 11 in layer 1 are 0.050" wide and 0.2" long, the offset channels 12 in layer 2 are 0.050" wide and 0.1" long, the overlap is 0.050" and the thickness of each layer is 0.015". The metal vias in this example part are 0.010" in diameter and are aligned through all five layers. The large openings 21, 22 are the fuel riser openings.

However, this is only one possible example and the channel dimensions including width, length, thickness, overlap, spacing, and general shape can be widely varied and are only limited by the fabrication methods. Likewise, the vias are not limited to circular shapes and can be varied in dimensions.

The ceramic-based IC can be fabricated from a number of materials including fully stabilized zirconia, partially stabilized zirconia, alumina, alumina-zirconia composites, such as alumina-YSZ or alumina-SSZ composites, and $MgO$—$SiO_2$ based materials including forstertite. The layers 1-5 can be made of the same or different ceramic materials. Suitable metals for the vias include Pt, Pd, Au, Ag or their alloys, or electrically conductive ceramic materials, such as LSM, LSCo or other conductive perovskite materials. The ceramic materials can be made by roll compaction or other ceramic fabrication techniques.

Various alternative configurations are also possible, as described below.

Offset Vias: The via containing the metal does not have to be co-axial in the z-direction, but can be offset, as described in U.S. application Ser. No. 10/822,707 filed on Apr. 13, 2004 and incorporated herein by reference in its entirety. For example, a via can be co-axial through layers 1 to 3, offset by a given amount in the x or y direction, and then be co-axial through layers 4 and 5. The two offset vias are connected electrically by a screen printed pad that resides between layers 3 and 4. This configuration allows for the use of differing metals in the vias for the air and fuel sides of the IC. For example, Pt metal can fill the air side of the offset via and Ni metal can fill the fuel side of the offset via. The offsetting of the vias ensures that the vias are hermetic if porosity develops in one of the metal fillers.

Conductive Oxide IC: The ceramic IC could be fabricated from an electrically conductive oxide, such as LSM, LSC or other conductive perovskite materials. Furthermore, as noted above, the vias could be filled with an electrically conductive oxide instead of a metal. Still further, the over-under gas flow configuration described herein may also be provided in a metal rather than a ceramic interconnect.

Catalysts: Catalysts can be added to the fuel side of the IC for internal reforming of hydrocarbon based fuels. The catalyst could be an insert in the channels, a coating on the channel surfaces, or incorporated into the ceramic material itself. For example, layer 5 of a 5-layer IC could be fabricated from a NiO/zirconia composite that upon reduction would result in a Ni-zirconia cermet.

Gas Manifolding: In the example shown in FIGS. 7-9, the fuel is internally manifolded and the air is externally manifolded, in a counter-flow geometry. However, any combination of internal-internal, internal-external, or external-external manifolding is possible. Likewise, flow geometries including counter-flow, co-flow, and cross-flow are possible with the IC design.

Number of Layers: While a five layer IC is illustrated in FIGS. 7-9, the IC may contain more or less than 5 layers. For example, layers 2 and/or 4 may be eliminated and substituted by protrusions on one or both surfaces of layer 3. In this case, the gases would flow over the protrusions in layer 3 and under the respective layers 1 and 5. In another configuration, the IC may comprise a single layer containing channels or tunnels extending below the surfaces of the IC to allow the gas flow to go under portions of the IC surfaces.

VII. SOFC Glass Fracturing Seal

Figure 12:
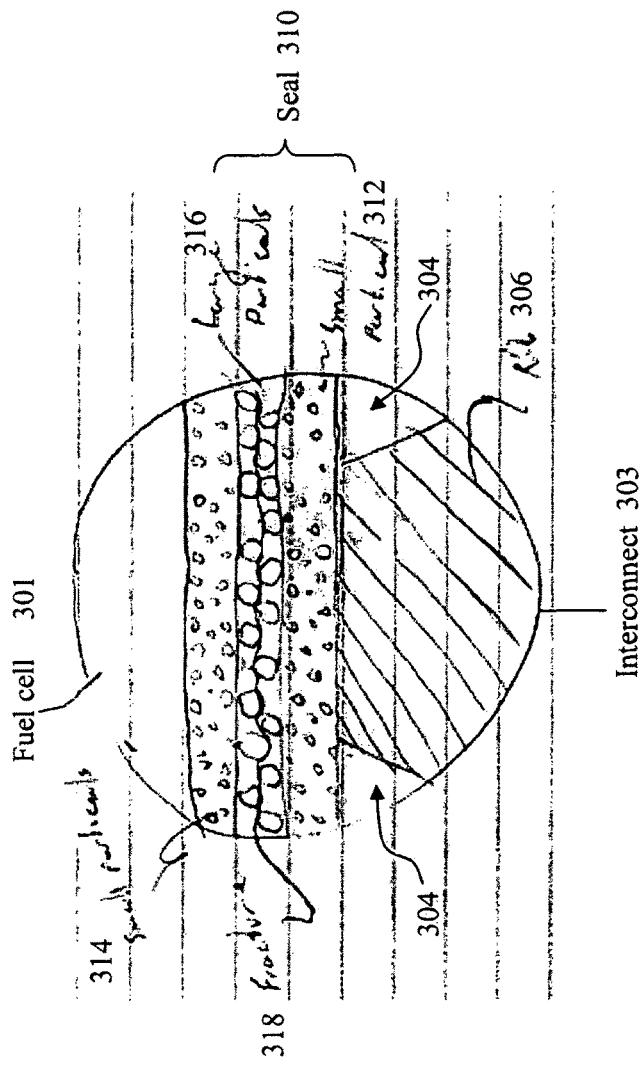
FIG. 12 is a side cross sectional view of a portion of a fuel cell stack according to the seventh embodiment.

The seventh embodiment of the invention provides a glass seal containing a weak boundary layer which will controllably fracture during thermal cycles. FIG. 12 illustrates an example of a glass fracturing seal 310. For example, the fuel cell seal 310 may be comprised of two glass 312, 314 layers with a layer of coarse ceramic 316 located between the glass layers. This coarse layer creates a weak boundary 318 between the layers of glass. In case of a coefficient of thermal expansion (CTE) mismatch between the fuel cell 301 and interconnect 303 materials, the weak layer will fracture as the stack heats up and cools. This provides a controlled fracture layer that doesn't harm the fuel cells during thermal cycles. In other words, the weak boundary layer creates a "crumple zone" which absorbs the CTE mismatch by fracturing, to prevent or reduce the fracture of the fuel cells. FIG. 12 shows the seal 310 located between a portion of the fuel cell 301, such as an electrolyte or one of the electrodes, and a rib 306 of an interconnect 303. The gas flow channels 304 are located between the interconnect ribs 306.

The seal may be located between each fuel cell and an adjacent interconnect in a fuel cell stack. The fuel cells are preferably solid oxide fuel cells. However, the seal may be used with other fuel cell types.

Any suitable glass materials may be used for the glass seal layers 312, 314. The glass may be completely amorphous or it may contain small ceramic or other particles (i.e., a glass-ceramic material). Any suitable ceramic material may be used as the weak layer 316. The ceramic weak layer preferably comprises large particles which will provide a fracture plane in case of thermal stresses.

Although the foregoing refers to particular preferred embodiments, it will be understood that the present invention is not so limited. It will occur to those of ordinary skill in the art that various modifications may be made to the disclosed embodiments and that such modifications are intended to be within the scope of the present invention. All of the publications, patent applications and patents cited herein are incorporated herein by reference in their entirety.

The invention claimed is:

1. A fuel cell stack, comprising:
a plurality of fuel cells separated by a plurality of conductive interconnects; and
at least one bypass electrical conductor located between two interconnects which is formed when a fuel cell between the two interconnects fails;
wherein the at least one bypass electrical conductor is located outside of the fuel cell; and
wherein the at least one bypass electrical conductor comprises a material which forms a conductive oxide upon oxidation.

2. The fuel cell stack of claim 1, wherein the material is a metal phase of a cermet material.

3. The fuel cell stack of claim 1, wherein the material comprises Fe or Co alloyed nickel.

4. A fuel cell stack, comprising:
a plurality of fuel cells separated by a plurality of conductive interconnects; and
at least one bypass electrical conductor located between two interconnects which is formed when a fuel cell between the two interconnects fails;
wherein the at least one bypass electrical conductor is located outside of the fuel cell;
wherein the at least one bypass electrical conductor comprises a layer of YSZ adjacent to a porous layer of LSM, and wherein the layer of YSZ becomes electrically conductive in response to the failure of the fuel cell between the two interconnects.

* * * * *